United States Patent
Vincent et al.

(10) Patent No.: US 8,376,819 B2
(45) Date of Patent: Feb. 19, 2013

(54) TEMPERATURE CONTROL SYSTEM IN A HEATING, AIR CONDITIONING AND VENTILATION DEVICE

(75) Inventors: Philipe Vincent, Epernon (FR); Richard Sikorski, Macomb, MI (US); Agnes Girardin, Lake Orion, MI (US); Joseph Spryshak, Hartland, MI (US)

(73) Assignee: Valeo Systemes Thermiques S.A.S., Le Mesnil Saint Denis (FR)

( * ) Notice: Subject to any disclaimer, the term of this patent is extended or adjusted under 35 U.S.C. 154(b) by 876 days.

(21) Appl. No.: 11/181,166

(22) Filed: Jul. 14, 2005

(65) Prior Publication Data

US 2006/0027354 A1 Feb. 9, 2006

(30) Foreign Application Priority Data

Jul. 16, 2004 (FR) ...................... 04 07841

(51) Int. Cl.
*B60H 1/00* (2006.01)
(52) U.S. Cl. ........ 454/156; 454/160; 454/161; 454/269; 454/261; 454/121; 165/42; 165/43; 237/12.3 A; 237/12.3 B
(58) Field of Classification Search .................. 165/203, 165/204, 42, 43; 454/156, 160, 161, 265, 454/269, 261, 267, 121; 237/12.3 A, 12.3 B
See application file for complete search history.

(56) References Cited

U.S. PATENT DOCUMENTS

| | | | | |
|---|---|---|---|---|
| 4,412,480 A | * | 11/1983 | Cardiff | 454/320 |
| 4,815,364 A | * | 3/1989 | Wagner et al. | 454/318 |
| 5,597,392 A | * | 1/1997 | Hawkins et al. | 454/290 |
| 6,668,909 B2 | * | 12/2003 | Vincent | 165/42 |
| 6,685,554 B2 | * | 2/2004 | Abouchaar | 454/121 |
| 2002/0157811 A1 | | 10/2002 | Vincent | |
| 2003/0042011 A1 | * | 3/2003 | Vincent | 165/203 |
| 2003/0056527 A1 | | 3/2003 | Fruhauf et al. | |

FOREIGN PATENT DOCUMENTS

| | | |
|---|---|---|
| DE | 19515836 A1 | 11/1995 |
| DE | 101 09 240 A1 | 9/2001 |
| EP | 1312493 A2 * | 5/2003 |
| EP | 1616734 A1 | 1/2006 |
| JP | 10-236134 A | 9/1998 |

OTHER PUBLICATIONS

English language translation of DE 19515836, machine translation, extracted on Aug. 23, 2011, 15 pages.
English language translation of JP 10-236134, extracted from PAJ website on Aug. 23, 2011, 41 pages.
Opposition Brief filed on behalf of Denso Automotive, submitted in the Opposition Proceedings for EP 1616734 before the European Patent Office, dated Sep. 18, 2008, 16 pages.
Communication of Patent Holder with English translation, submitted in the Opposition Proceedings for EP 1616734 before the European Patent Office, dated Dec. 1, 2009, 17 pages.
Letter of Opponent, submitted in the Opposition Proceedings for EP 1616734 before the European Patent Office, dated Feb. 25, 2010, 6 pages.

* cited by examiner

*Primary Examiner* — John Ford
(74) *Attorney, Agent, or Firm* — Howard & Howard Attorneys PLLC (57) ABSTRACT

Temperature control system at the outlet from at least one distribution opening (10, 11) of a transit chamber (30) of a heating and air conditioning device.
According to the invention, said system comprises a plurality of air ducts (20, 50) passing through the transit chamber (30) as far as the distribution opening (10, 11).
Automobile vehicle ventilation, heating and air conditioning application.

21 Claims, 8 Drawing Sheets

TEMPERATURE CONTROL SYSTEM IN A HEATING, AIR CONDITIONING AND VENTILATION DEVICE

This invention relates to a temperature control system at the outlet from at least one distribution opening from a transit chamber in a ventilation, heating or possibly air conditioning device.

One particularly advantageous application of the invention is in the field of ventilation, heating and air conditioning device in automobile vehicles, for single zone or multi-zone devices installed inside the passenger compartment of a vehicle (for example in the front or back of the vehicle), or outside (for example on a windshield frame or under the floor).

In the remainder of this presentation, the term distribution openings refers to windshield de-icing openings, side windows and floor openings or dashboard front or top ventilation openings, and possibly air supply openings in the back of the car.

In general, automobile vehicles are provided with heating and air conditioning devices including a transit chamber, usually a mixing chamber that mixes hot air from the vehicle radiator with cold air from a cold air supply, either directly from outside the vehicle or after passing through an evaporator. A mixing flap varies the mix temperature, by allowing more or less cold air to enter into the mixing chamber. Thus, the user can control the air temperature output from the mixing chamber for example through a ventilation opening, itself provided with an air inlet flap.

However, it can always be observed that with this type of device it is impossible to adjust the air temperature output from the ventilation opening independently of the air temperature obtained in the mixing chamber.

This is why devices specially designed to perform this function are provided in some vehicles, mainly in high range vehicles.

Figure 1:
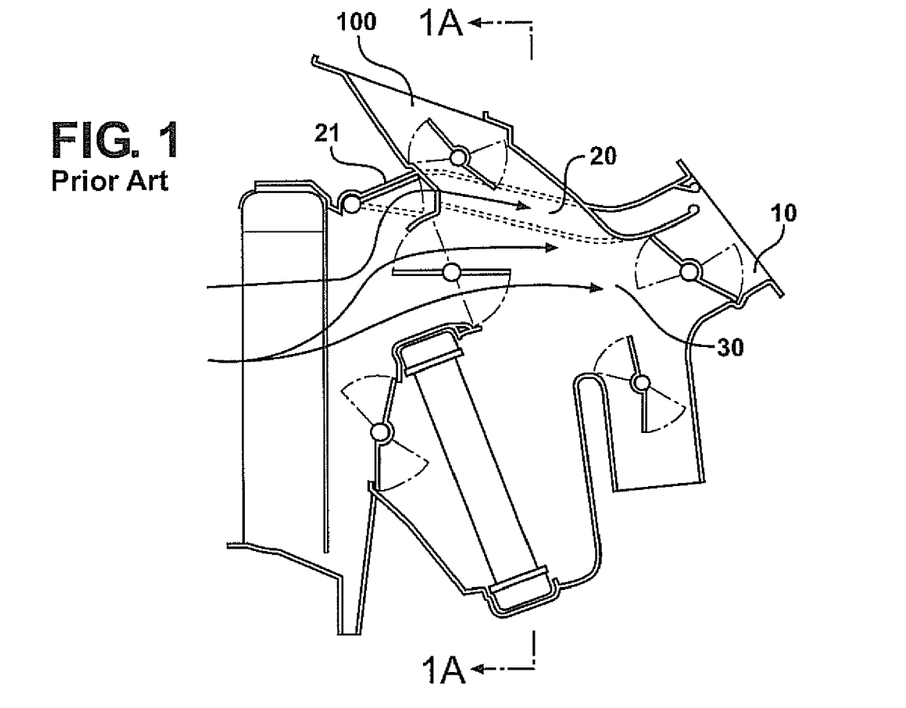
FIG. 1 shows a view of a known ventilation, heating and possibly air conditioning device.
Figure 1A:
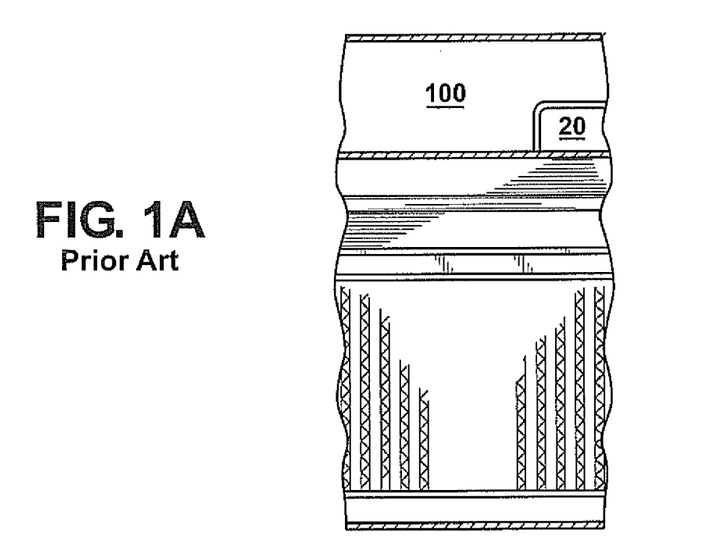
FIG. 1A shows a cross sectional view along cut line 1A-1A shown in FIG. 1 of the known ventilation, heating and possibly air conditioning device shown in FIG. 1.

In the example in FIG. 1 that shows a side view of a heating and air conditioning device provided with a known temperature control system, independent temperature regulation at the outlet from the ventilation opening 10 is obtained by the addition of a duct 20 channeling cold air parallel to air produced by the mixing chamber 30. A regulation flap 21 varies the quantity of additional cold air allowed to enter in the vicinity of the aeration opening 10 and therefore in a way modulates the air temperature output by the mixing chamber 30.

However, this known temperature control system does have a number of disadvantages.

Due to the position of ventilation openings in the device, it is almost always necessary to cross the independent cold air duct with one or several distribution openings (such as the de-icing opening 100 in FIG. 1), before reaching the outlet from the ventilation opening 10 to which the channeled cold air is to be sent. This intersection is a physical interference that makes it necessary to either reduce the section of the independent cold air duct, or to reduce the section of the distribution opening concerned for a given total section. This causes a critical restriction, for example of the distribution opening with the result that it becomes impossible to obtain the air flows necessary for the user's comfort.

Furthermore, the position of the independent cold air duct on one of the faces of the device housings means that the cold air inlet orifice is not well positioned with respect to the main air circuit. In order to benefit from a sufficient quantity of cold air, the inlet volume and the internal section of the duct must be designed accordingly. The result is that the global volume to be reserved to make the required function is large and detrimental to the correct sizing of other elements and sections of the device.

Similarly, the position of the cold air duct in the housing of a device is the result of the position of the other openings and the selected molding principle for the housings, with the result that the position of the duct is not always ideal to perfectly fulfill the function. This duct is then molded at the same time as the housing of the installation, with the consequence that it is necessarily placed against a sidewall of the housing. Moreover, even if the duct is correctly sized to create the required temperature difference, the cold air must be injected into the ventilation opening so as to guarantee perfect uniformity at the outlet from the opening, which is obviously not the case when the duct is molded on the housing wall. The final user will feel temperature gradients in his aerator that reduce comfort, particularly colder in the area close to the distribution opening approximately in line with the duct and warmer near the central area.

Finally, in some cases the design of existing solutions makes it necessary to use a large number of parts to make the independent temperature control function, including several cold air regulation flaps. This arrangement increases the production cost as a function of the price of components and a longer assembly time.

Another technical problem to be solved by this invention is to propose a temperature control system at the outlet from at least one distribution opening of a transit chamber of a heating and air conditioning device, that would avoid design interferences at the distribution openings while presenting optimum positioning of the duct and good temperature uniformity at the outlet from the distribution opening and a lower production cost.

The solution provided by this invention to this technical problem consists in that said system comprises a plurality of air ducts passing through the transit chamber as far as the distribution opening.

Thus, it can be understood that with the system according to the invention there is no intersection of airflow channels immediately adjacent to other distribution openings. Since the output sections of these openings are not affected, the result is greater positioning freedom and easy design and integration of the device into the vehicle passenger compartment.

"Crossing through the transit chamber" means ducts independent of the housing walls advantageously organized in the form of a distinct module that is integrated into the transit chamber.

The size of a mixing chamber may be made large to enable sufficient air mixing and to guarantee a low pressure loss in the different air circuits.

Therefore positioning constraints on air ducts to associated distribution openings are reduced.

According to one particular embodiment of the invention, said air ducts are at least partly cold air and/or hot air ducts.

In this case, according to the invention, it is advantageous that the inlet of the cold air duct or hot air duct should be placed directly facing a cold air or hot air supply flow from the mixing chamber. In this way, an optimum supply of air to the ducts is obtained.

Note also that the position of the outlet from the cold air ducts in the distribution opening is well adapted to provide satisfactory uniformity of the air temperature at the outlet from the distribution opening. Each of the ducts forming the system can open all along the distribution opening, unlike in the prior art where the duct opens only close to the wall of the housing.

Finally, the invention also allows for cold air ducts or hot air ducts to be integrated into an aerothermal control assembly of said device. This integration can be achieved by molding with said aerothermal control assembly.

Economically, this integration solution has the advantage that it does not introduce any additional cost, while it takes advantage of the technical disadvantages of the aerothermal control assembly.

More particularly, and relating to pressure losses, this configuration is ideal because the cold air ducts are superposed on the hot air blocking shapes already formed in the aerothermal control assembly to protect the cold air passage. This configuration is obviously possible for an aerothermal control assembly that includes cold air ducts and also hot air ducts.

In one particular embodiment, said aerothermal control assembly is a cross flow baffle. It is then possible to envisage that cold air flow channels in said baffle are shorter than the cold air ducts. This special feature is particularly advantageous in that the dimensions of the cross flow baffle are adapted to the mixing chamber while the hot added air or cold air brought in through the ducts is delivered further to the downstream side in the duct or the distribution opening.

Note that the invention also relates to the case in which said air ducts are at least partly hot air ducts, possibly but not necessarily in combination with cold air ducts or with the aerothermal control assembly.

The use and advantages of the hot air ducts are identical to the use and advantages resulting from the layout of cold air ducts.

The following description with reference to the attached figures given as non-limitative examples will facilitate understanding of the content of the invention and how it can be made.

Figure 2:
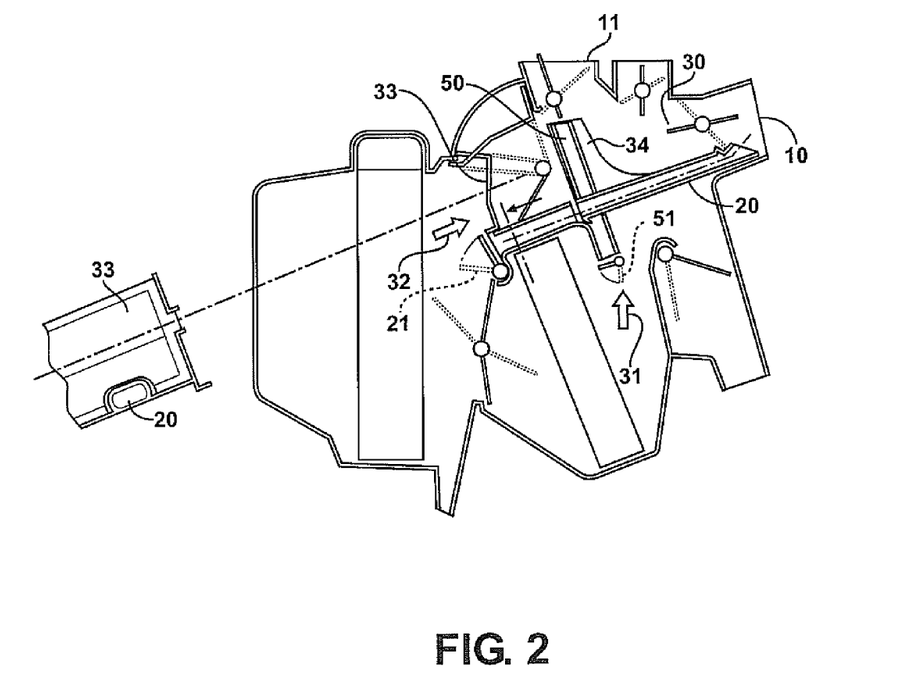
FIG. 2 shows a side view of a ventilation, heating and possibly air conditioning device provided with a temperature control system according to the invention.

FIG. 2 shows a ventilation, heating and possibly air conditioning device, particularly for automobile vehicles, equipped with a temperature control system at the outlet from a distribution opening 10, in this case a ventilation opening, a transit chamber 30 which in the embodiment example in FIG. 2 is a mixing chamber for mixing hot air 31 from the vehicle radiator with cold air 32 from a cold air inlet.

The air temperature outlet from the mixing chamber 30 and distributed through the ventilation opening 10 may be controlled by regulating the quantity of cold air 32 entering into the chamber using a mixing flap 33.

The installation is not limited to the use of an evaporator 60 like that shown in FIG. 2. The technical effect required by the invention is not related to the fact that the air is cooled. The system according to the invention can also operate with cold air taken directly from outside the vehicle.

As shown in FIG. 2, said temperature control system includes parallel cold air ducts 20 passing through the mixing chamber 30 as far as the ventilation opening 10.

The device is provided with a cold air inlet regulation flap 21 inside the ducts 20. Thus, the quantity of cold air mixing with the air flow output from the mixing chamber 30 may be modulated as a function of the opening of the regulation flap 21, to control the air temperature output from the ventilation opening 10.

The fact that the outlet from the cold air ducts 20 is placed inside and around the entire width of the ventilation opening 10 leads to excellent uniformity of air temperature in the vehicle and better comfort for the user.

FIG. 2 also shows that the inlet to the cold air ducts 20 is directly facing the cold air supply flow 32 to the mixing chamber 30, which makes the cold air supply to the ducts 20 very simple.

Finally, FIG. 2 shows the presence of hot air ducts 50, for which the hot air inlet is controlled by a flap 51. In the example in FIG. 2, these ducts 50 are provided to control the outlet temperature from a de-icing opening 11.

FIGS. 2, 3*a*, 3*b* and 3*c* show a particular embodiment of the invention in which a plurality of cold air ducts 20 and possibly a plurality of hot air ducts 50 are integrated, for example by molding, in an aerothermal control assembly of the device consisting of a cross flow baffle 34. It is an independent part of the device that may for example be integrated in the mixing chamber like a rack.

Figure 3A:
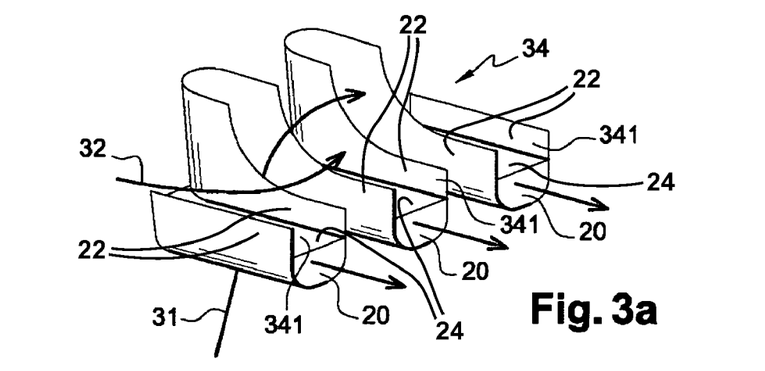
FIG. 3*a* shows a perspective view of a cross flow baffle assembly provided with cold air ducts according to the invention.
Figure 3B:
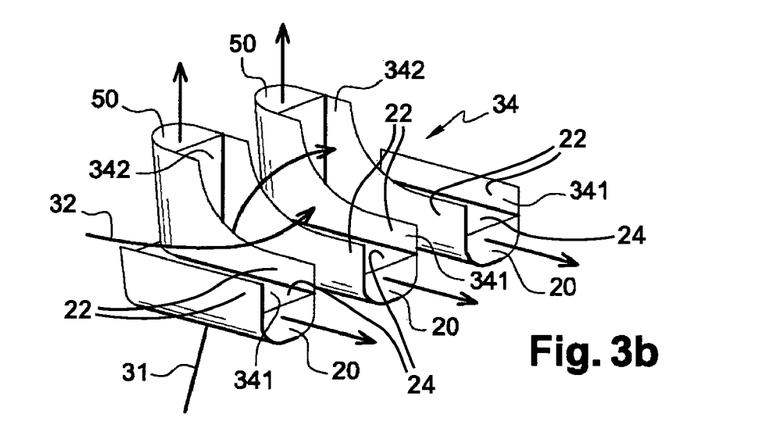
FIG. 3*b* shows a perspective view of a cross flow baffle assembly provided with cold air ducts and hot air ducts according to the invention.
Figure 3C:
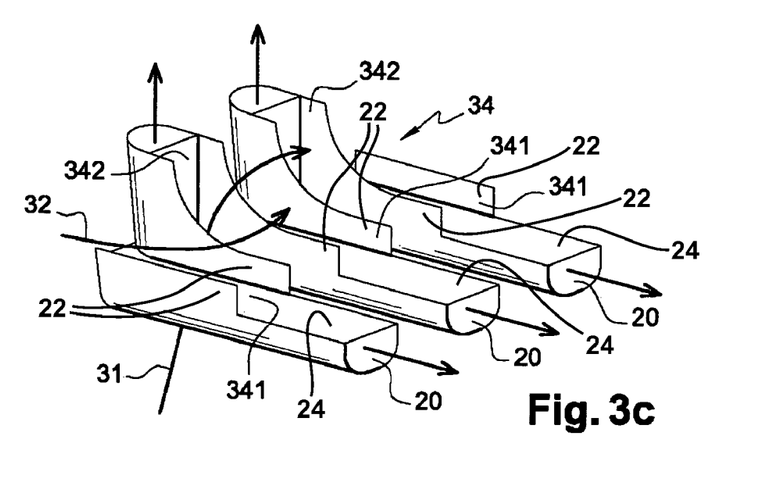
FIG. 3*c* is a perspective view of the baffle assembly in FIG. 3*b* showing cold air channels shorter than the cold air ducts.

In FIG. 3*a*, only the cold air ducts 20 have been integrated into the baffle 34. FIG. 3*b* shows simultaneous integration of cold air ducts 20 and hot air ducts 50 in the baffle 34. Finally, FIG. 3*c* shows an embodiment in which the cold air flow channels 341 from said baffle 34 are shorter than the cold air ducts 20. Obviously, the same could be true for hot air channels 342 relative to the hot air ducts 50.

These figures also show that the main cold air supply flows from the mixing chamber 30 and the cold air ducts 20 are superposed.

Figure 4:
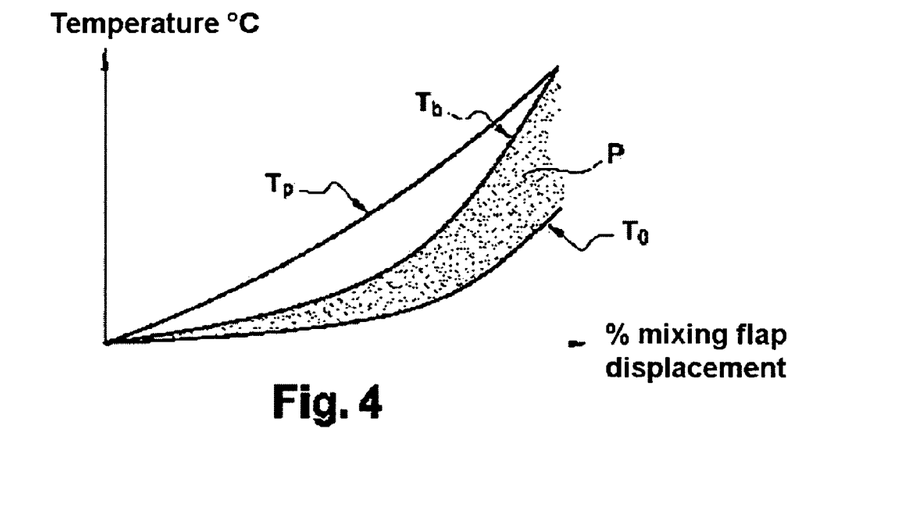
FIG. 4 shows a temperature graph as a function of the displacement of the mixing flap for the control system in FIG. 2.

In the embodiment in FIG. 2, the mixing flap 33 is outside the cold air ducts 20, such that the maneuver of the mixing flap has no effect on the quantity that enters the ducts. This configuration is shown by the graph in FIG. 4 showing variations of the different temperatures as a function of the opening of the mixing flap 33. The example in this case is for a bilevel regulation, namely regulation of the temperature (T° feet) at the user's feet and the aeration temperature (T° aeration) supplied by the system in FIG. 2 at the outlet from the ventilation opening 10.

As can be seen in FIG. 4, the aeration temperature can be adjusted to a complete regulation range P between temperature To and Tf corresponding to the open and closed positions respectively of the regulation flap 21 regardless of the position of the mixing flap 33. The temperature Tp at the feet of passengers in the front of the vehicle is shown for reference purposes.

Figure 5:
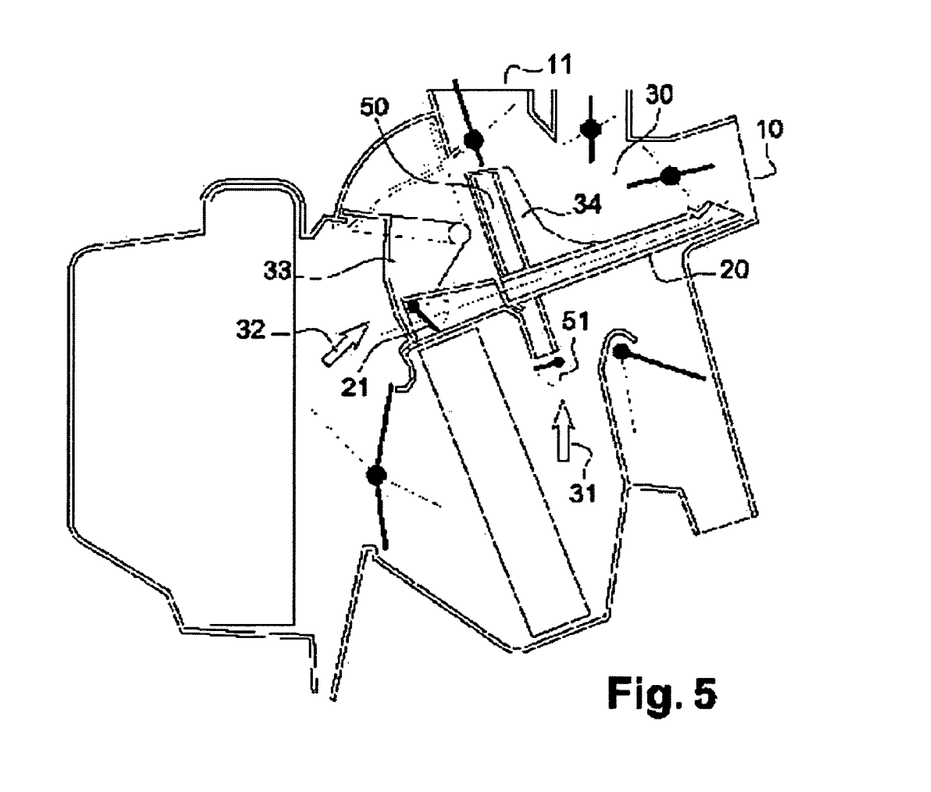
FIG. 5 shows a side view of a first variant of the heating and air conditioning device in FIG. 2.

Conversely, FIG. 5 shows a variant in which the mixing flap 33 placed in front of the regulation flap 21 can completely or partially close off the ducts 20.

Figure 6A:
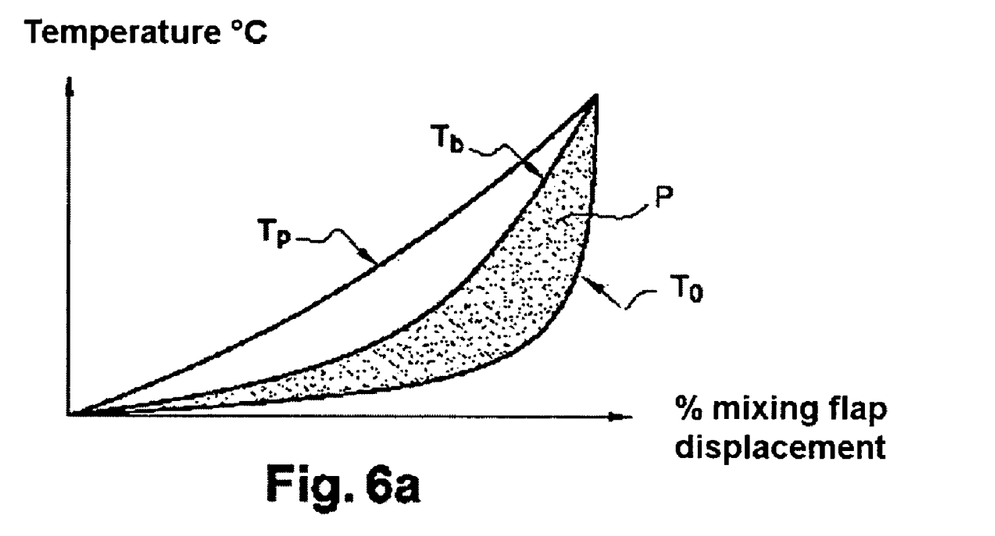
FIG. 6*a* shows a temperature graph as a function of the displacement of the mixing flap for the control system in FIG. 5 in the case of complete closing of the cold air ducts by the mixing flap.

If the mixing flap 33 could completely close off the ducts 20, the variations in the aeration temperature are as shown in FIG. 6a in which the regulation range P is reduced with the degree of closing of the mixing flap 33 to become zero when closing is complete since at this time the regulation flap 21 has no effect, since there is no cold air passing through the ducts 20.

It is thus possible to close off the entire cold air injection into the vehicle for a "Maximum heat" temperature selection.

Figure 6B:
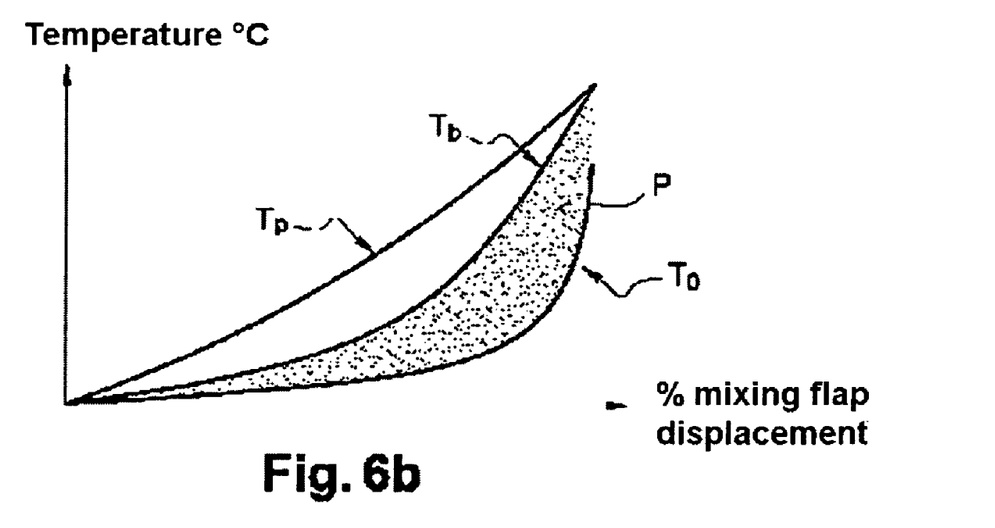
FIG. 6*b* shows a graph of the temperature as a function of the displacement of the mixing flap for the control system in FIG. 5 in the case of partial closing of the cold air ducts by the mixing flap.

An intermediate situation is shown in FIG. 6b in which the mixing flap 33 can only partially close off the ducts 20, in the maximum position. The temperature regulation range P is then between the temperatures defined in FIGS. 5 and 6a.

Figure 7A:
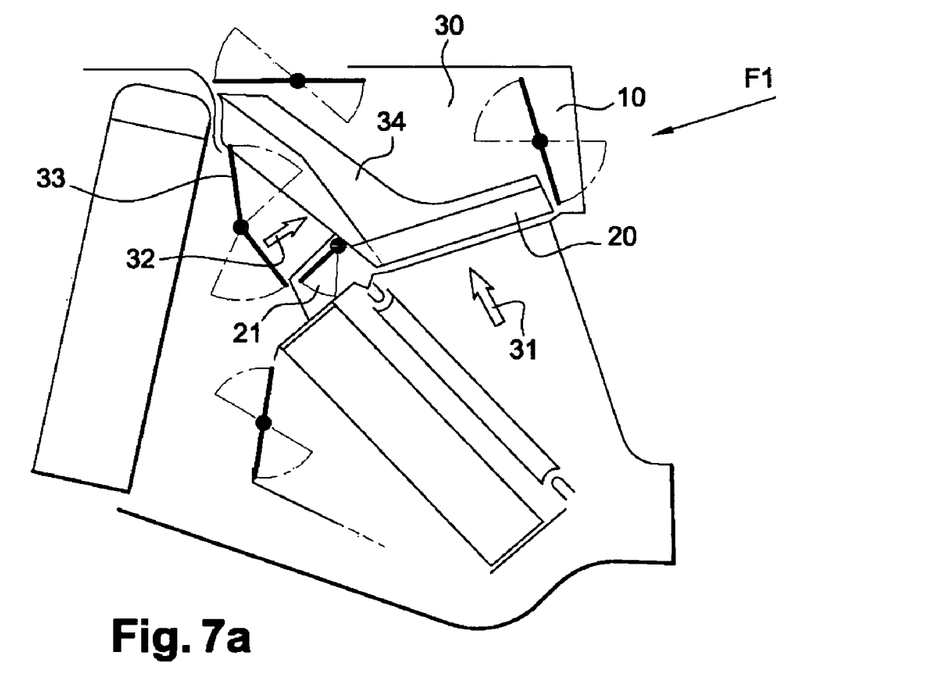
FIG. 7*a* shows a side view of a second alternative embodiment of the heating and air conditioning device in FIG. 2.
Figure 7B:
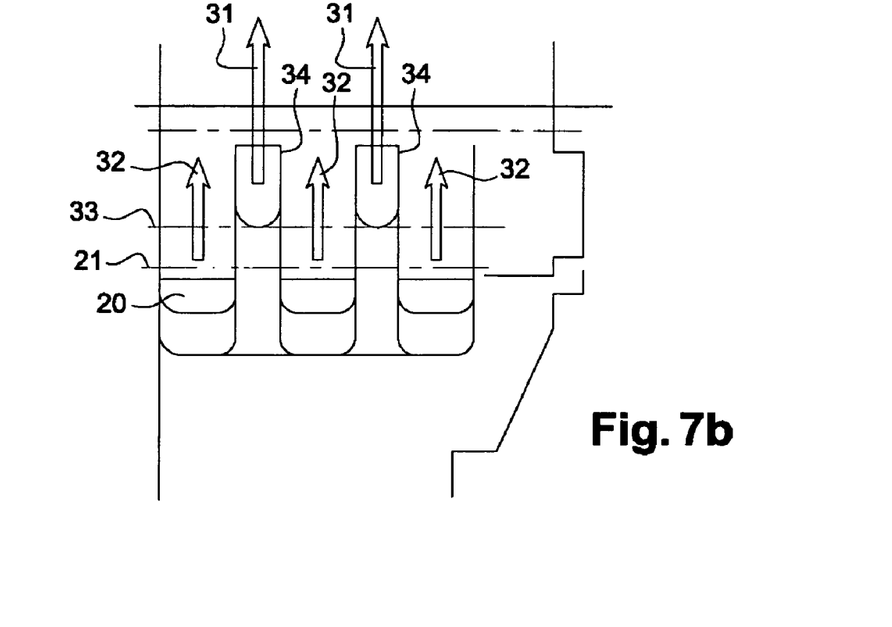
FIG. 7*b* shows a view of the device in FIG. 7*a* along arrow F1.

FIGS. 7a and 7b illustrate an alternative embodiment showing that the mixing flap 33 may be in different forms, particularly a butterfly valve.

Figure 8A:
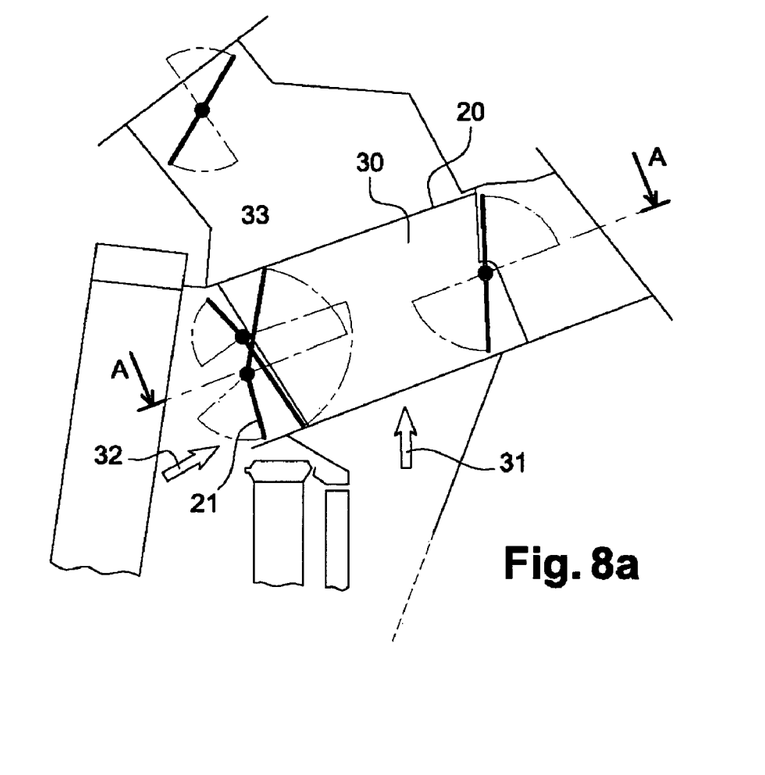
FIG. 8*a* shows a side view of a third alternative embodiment of the heating and air conditioning device in FIG. 2.
Figure 8B:
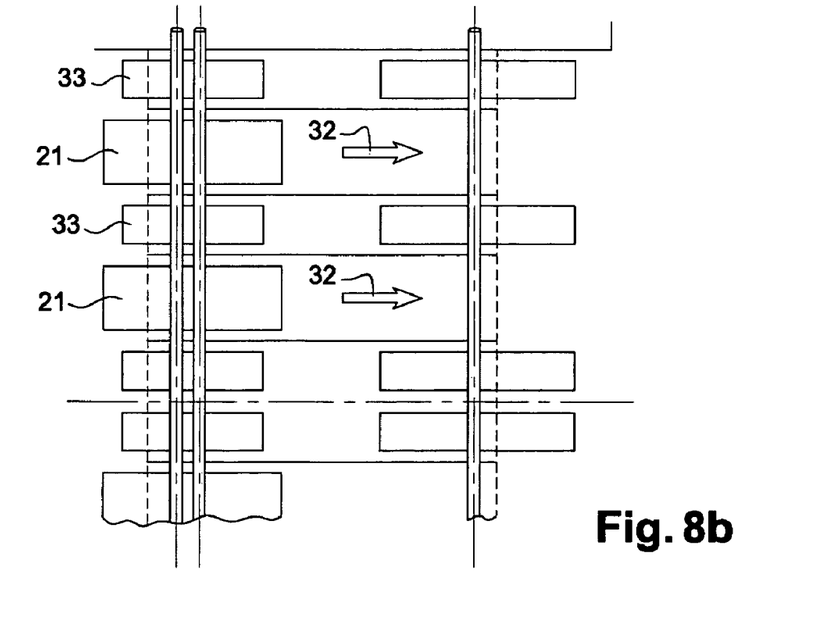
FIG. 8*b* shows a view of the device in FIG. 8*a* along the A-A axis.

To control the dimensions along the direction of the z axis, in other words along the direction between the bottom and the top of FIG. 8a, it may be difficult to superpose the main cold air supply flows for the mixing chamber 30 and the cold air ducts 20, as shown in FIGS. 2 and 3, along this axis. In this case, another arrangement can be adopted in which the main flows and the ducts are placed laterally as illustrated in FIGS. 8a and 8b.

Finally, in some special cases, all the cold air ducts may be independent of any additional aerothermal control assembly.

For example, this arrangement is applicable to designs of heating and air conditioning devices for which there is no need to use this assembly to obtain performances requested in the device specifications.

Figure 9A:
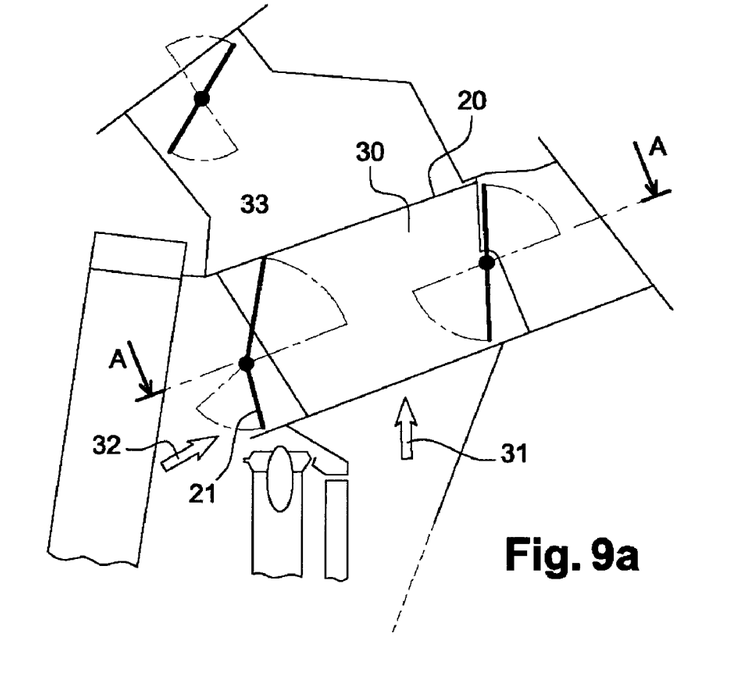
FIG. 9*a* shows a side view of a fourth alternative embodiment of the heating and air conditioning device in FIG. 2.
Figure 9B:
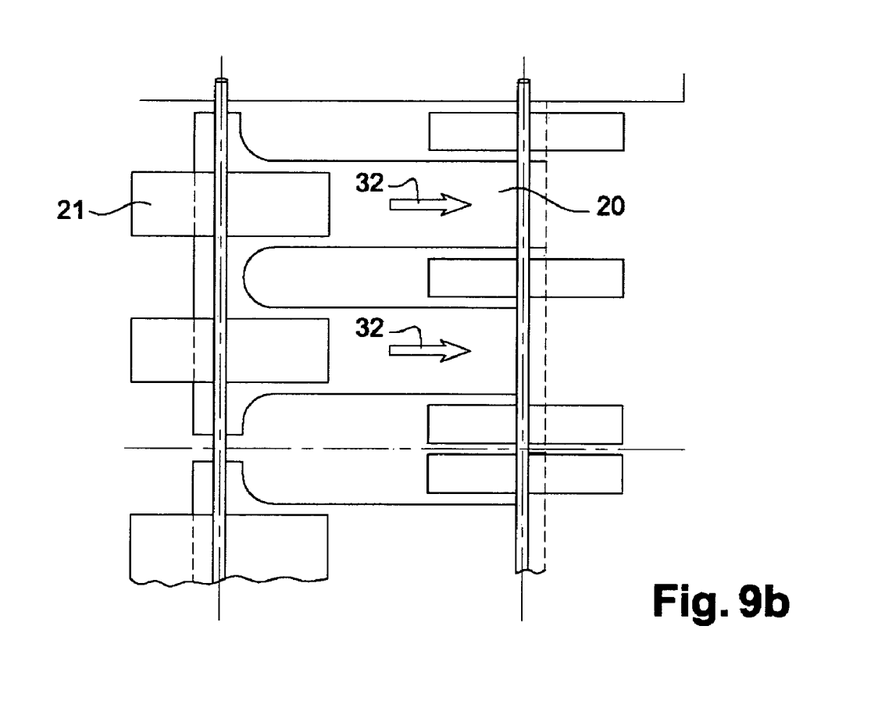
FIG. 9*b* shows a view of the device in FIG. 9*a* along the A-A axis.

It may also be applicable to other device designs using a temperature regulation principle other than air mixing. This situation is illustrated in FIGS. 9a and 9b in which the principal flow output from the ventilation opening 10 is a hot air flow for which the temperature is adjusted by a valve 41 controlling liquid inlet into the radiator 40 and not through the cold air supply and mixing with hot air in the chamber 30.

The invention claimed is:

1. A ventilation, heating and/or air conditioning device comprising:
   a mixing chamber (30) fed by a cool air flow (32) and a hot air flow (31), the mixing chamber being provided with at least one distribution opening (10, 11);
   a temperature control system (34) disposed in the mixing chamber (30) wherein the temperature control system comprises a plurality of air ducts (20, 50) passing through the mixing chamber (30) wherein the air ducts (20, 50) are at least partly cold air ducts (20);
   a pair of walls (22) spaced from each other and extending from one of the cold air ducts (20) into the mixing chamber (30) to define a cold air channel (341) extending geometrically parallel with the one cold air duct (20) with the cold air channel (341) open to the mixing chamber (30);
   a partition (24) intersecting the pair of walls (22) and fixed to and stationary with the pair of walls (22) and disposed between and separating the one cold air duct (20) and the cold air channel (341);
   the one cold air duct (20) being hollow and defined by the pair of walls (22) and the partition (24);
   the cold air channel (34) being defined by the pair of walls (22) and the partition (24) with the cold air channel (341) open to the mixing chamber (30) on an opposite side of the partition (24) from the one cold air duct (20); and
   wherein the cold air ducts (20) are directly facing the cold air flow (32) entering the mixing chamber (30) and pass through the mixing chamber (30) into the distribution opening (10).

2. A ventilation, heating and/or air conditioning device according to claim 1, characterized in that said air ducts are at least partly hot air ducts (50).

3. A ventilation, heating and/or air conditioning device according to one of the previous claims, characterized in that an inlet of at least one of the air ducts (20, 50) is placed across the mixing chamber (30) opposite from an inlet of an air supply flow (31, 32) and directly facing the inlet of the air supply flow (31, 32).

4. A ventilation, heating and/or air conditioning device according to claim 3, characterized in that the air ducts (20, 50) are arranged in alternating relationship and the air supply flows (31, 32) are arranged in the mixing chamber (30) in alternating relationship.

5. A ventilation, heating and/or air conditioning device according to claim 3, characterized in that the air ducts (20, 50) and the air supply flow (31, 32) are arranged laterally in the mixing chamber (30).

6. A ventilation, heating and/or air conditioning device according to claim 1, characterized in that the mixing chamber (30) is a cold air flow (32) and a hot air flow (31) mixing chamber.

7. A ventilation, heating and/or air conditioning device according to claim 6, characterized in that the mixing chamber (30) comprises a mixing flap (33), said mixing flap is outside the cold air ducts (20).

8. A ventilation, heating and/or air conditioning device according to claim 6, characterized in that the mixing chamber (30) comprises a mixing flap (33), said mixing flap being capable of at least partially closing off the cold air ducts (20).

9. A ventilation, heating and/or air conditioning device according to claim 2, characterized in that the hot air ducts (50) are integrated into an aerothermal control assembly (34) of said device.

10. A ventilation, heating and/or air conditioning device according to claim 9, characterized in that said aerothermal control assembly is a cross flow baffle (34).

11. A ventilation, heating and/or air conditioning device according to claim 10, characterized in that the cross flow baffle (34) comprises hot air flow channels (342) shorter than the hot air ducts (50).

12. A ventilation, heating and/or air conditioning device according to claim 10, characterized in that the cross flow baffle (34) comprises cold air flow channels (341) shorter than the hot air ducts (50).

13. A ventilation, heating and/or air conditioning device according to claim 1, characterized in that the mixing chamber (30) is an air chamber in which the temperature is regulated by a radiator.

14. A ventilation, heating and/or air conditioning device according to claim 1, further comprising a mixing flap (33) configured to move between an open position to allow cold air flow (32) to enter the cold air channel (341) and a closed position to block cold air flow (32) from the cold air channel (341).

15. A ventilation, heating and/or air conditioning device according to claim 14, further comprising an inlet regulation flap (21) configured to move between an open position to allow cold air flow (32) to enter the cold air duct (20) and a closed position to block cold air flow (32) from the cold air duct (20).

16. A ventilation, heating and/or air conditioning device according to claim 1, further comprising a flap (51) configured to move between an open position to allow hot air flow (31) to enter the hot air duct (50) and a closed position to block hot air flow (31) from the hot air duct (50).

17. A ventilation, heating and/or air conditioning device according to claim 1, characterized in that the cold air duct (20) includes an inlet end for receiving a cold air supply flow (32) and an outlet end spaced from the inlet end at the distribution opening (10, 11) for delivering the cold air supply flow (32) to the distribution opening (10, 11).

18. A ventilation, heating and/or air conditioning device according to claim 17, further comprising a valve disposed at the distribution opening (10, 11) and moveable between an open position opening the distribution opening (10, 11) to the mixing chamber (30) and a closed position disposed between the mixing chamber (30) and the distribution opening (10, 11).

19. A ventilation, heating and/or air conditioning device according to claim 17, characterized in that the partition extends from the inlet end to the outlet end of the cold air duct (20).

20. A ventilation, heating and/or air conditioning device comprising:
- a mixing chamber (30) fed by a cool air flow and a hot air flow the mixing chamber being provided with at least one distribution opening (10, 11);
- a temperature control system disposed in the mixing chamber (30) wherein the temperature control system comprises a plurality of air ducts (20, 50) passing through the mixing chamber (30) wherein the air ducts (20, 50) are at least partly cold air ducts (20);
- a pair of walls (22) spaced from each other and extending from one of the cold air ducts (20) into the mixing chamber (30) to define a cold air channel (341) extending geometrically parallel with the one cold air duct (20) with the cold air channel (341) open to the mixing chamber (30);
- a partition (24) intersecting the pair of walls (22) and fixed to and stationary with the pair of walls (22) and disposed between and separating the one cold air duct (20) and the cold air channel (341);
- a mixing flap (33) configured to move between an open position to allow cold air flow (32) to enter the cold air channel (341) and a closed position to block cold air flow (32) from the cold air channel (341); and
- wherein the cold air ducts (20) are directly facing the cold air flow (32) entering the mixing chamber (30) and pass through the mixing chamber (30) into the distribution opening (10).

21. A ventilation, heating and/or air conditioning device according to claim 20, characterized in that the air ducts (20, 50) are arranged in alternating relationship and the air supply flows (31, 32) are arranged in the mixing chamber (30) in alternating relationship.

* * * * *

UNITED STATES PATENT AND TRADEMARK OFFICE
CERTIFICATE OF CORRECTION

| | | |
|---|---|---|
| PATENT NO. | : 8,376,819 B2 | Page 1 of 1 |
| APPLICATION NO. | : 11/181166 | |
| DATED | : February 19, 2013 | |
| INVENTOR(S) | : Vincent et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this
Thirtieth Day of December, 2014

Michelle K. Lee
*Deputy Director of the United States Patent and Trademark Office*